United States Patent
Gibbs et al.

(10) Patent No.: US 7,170,988 B2
(45) Date of Patent: Jan. 30, 2007

(54) METHOD AND APPARATUS FOR NETWORK COMMUNICATION

(75) Inventors: Jonathan A. Gibbs, Southampton (GB); James P. Ashley, Naperville, IL (US); Halil Fikretler, Basingstoke (GB); Mark A. Jasiuk, Chicago, IL (US); Michael J. McLaughlin, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 619 days.

(21) Appl. No.: 10/694,571

(22) Filed: Oct. 27, 2003

(65) Prior Publication Data

US 2005/0100005 A1    May 12, 2005

(51) Int. Cl.
*H04M 7/00* (2006.01)
*H04J 3/16* (2006.01)
*H04J 3/22* (2006.01)

(52) U.S. Cl. ........................ 379/224; 370/467
(58) Field of Classification Search .............. 379/224, 379/229, 230; 370/467, 469, 522, 395.2; 375/240.25, 240.08, 240.26; 704/201, 501
See application file for complete search history.

(56) References Cited

U.S. PATENT DOCUMENTS

| | | | | |
|---|---|---|---|---|
| 4,924,480 A | * | 5/1990 | Gay et al. | 375/222 |
| 2001/0029182 A1 | * | 10/2001 | McCann et al. | 455/433 |
| 2002/0186723 A1 | * | 12/2002 | Sprague et al. | 370/524 |
| 2003/0193696 A1 | * | 10/2003 | Walker et al. | 358/402 |
| 2005/0232232 A1 | * | 10/2005 | Farber et al. | 370/352 |

* cited by examiner

*Primary Examiner*—Benny Quoc Tieu

(57) ABSTRACT

A method of enhanced tandem communication is provided between at least a first portion of a network suitable for voice communications and a second portion of a network suitable for voice communications. During operation, two representations of an encoded signal are transmitted from the first portion of a network. The two representations comprise the encoded signal produced by a first codec and a parameter translation of the first encoded signal into an encoded signal compatible with a single common compressed voice codec (CCVC) format.

11 Claims, 2 Drawing Sheets

METHOD AND APPARATUS FOR NETWORK COMMUNICATION

TECHNICAL FIELD

The invention relates to a method and apparatus for network communication. In particular, it relates to a method and apparatus for tandemming network communications.

BACKGROUND

Mobile telecommunications networks can choose between a large number of encoding and decoding schemes (codecs) for speech transmission. However, when two networks select different codecs (or different parts of the same network select different codecs), then communications between those two entities requires tandemming.

For example, a coding sequence between a CDMA (code division multiple access) mobile phone and a GSM (global system for mobile communication) mobile phone may be as follows:
  i. A CDMA mobile phone on a first network encodes speech with CDMA codec 1.
  ii. Codec 1 encoded speech is transmitted to a CDMA base station.
  iii. The CDMA Base station decodes the codec 1 speech and encodes the result using PCM (pulse code modulation).
  iv. The PCM encoded speech is transmitted via a wire-line to second, GSM, network.
  v. A GSM base station of the second network decodes the received PCM speech and encodes the result using GSM codec 2.
  vi. Codec 2 encoded speech is transmitted to a GSM mobile phone on the second network.

Thus in the above tandemming arrangement, the low bandwidth, high compression codecs used for wireless transmission are linked by a common high bandwidth, low compression PCM encoding scheme for the wireline part of the communication.

However, the resulting end-user received speech tends to be of poor quality. The primary reason is that speech reconstructed from one high compression codec is generally not ideal as input to another high compression codec. Such codecs typically generate high-level parameterisations of the speech with minimal redundancy, with the result that the reconstructed speech used by the PCM contains regularities and approximations not found in the original. A second codec seeking to generate a slightly different set of high-level parameterisations will find that the salient characterising information it assumes to be present has been removed or just interpolated by the first codec. The result is a poor representation of the speech by the second codec.

Currently, the concept of tandem-free operation (TFO) addresses this problem (see ETSI, "Technical Specification Digital cellular telecommunications system (Phase 2+); Universal Mobile Telecommunications System (UMTS); Inband Tandem Free Operation (TFO) of speech codecs; Service description; Stage 3 (3GPP TS 28.062 version 5.3.0 Release 5)" ETSI TS 128 062 V5.3.0 (2002-12)).

However, it only does so if the two networks have the same codec available. That is, the same access technology or compatible (e.g. between AMR (adaptive multi-rate) capable GSM networks and 3GPP (third generation partnership project) networks), and additionally only if end-to-end negotiation on call set-up is possible. Thus it is not applicable when dissimilar codecs are used or when end-to-end negotiation is not possible or not implemented.

Dilithium Networks also provide a solution to the problems raised by tandemming, known as Unicoding™. (http://www.dilithiumnetworks.com/technology/voice.htm)

This solution requires that one of three alternatives be pursued: Either the first codec's data is conveyed to the second network prior to translation to it's codec format, or the data is translated in the first network to the second codec's format before being sent to the second network, or the data from the first codec is routed to a proxy server to perform the translation and then routed from the proxy server to the second network.

Referring to FIG. 1, Unicoding employs CELP (code excited linear predictive) codec parameter translation from one codec data format 110 to another 130 and requires dedicated translation modules 120, 130 to be available for all possible codec to codec permutations.

This is not a simple solution however as, for example, just for 3GPP2 to GSM networks this would require Unicoding translation modules to be available to and from each of the four 3GPP2 codecs (IS-733, IS-96A, EVR (enhanced variable rate) and SMV (selectable mode vocoder)) to and from each of the three GSM codecs (Full-Rate, Half-Rate and AMR including EFR (enhanced full rate)). These twelve permutations are then further compounded by the multiple available modes for SMV (2 or 3 likely deployment modes) and the 10 modes of AMR, increasing the permutations to 60 or 72. Whilst there would be significant commonality between many of these, the problems of developing and deploying a large number of Unicoding translation modules over a number of networks, and the process of redeployment upon the introduction of any new codecs makes the solution appear unwieldy.

Many of the principles applied in the Dilithium Networks solution can also be found in H-G. Kang, H. K. Kim & R. V. Cox, "Improving Transcoding Capability of Speech Coders in Clean and Frame Erasured Channel Environments," Proceedings of the 2000 IEEE Workshop on Speech Coding, 2000.

There appears to still be a need for an alternative method of tandem communication that provides both improved voice quality and a simple means of operation across one or more networks.

The purpose of the present invention is to address the above problems.

SUMMARY OF THE INVENTION

The present invention provides a method of enhanced tandem communication between at least a first portion of a network suitable for voice communications and a second portion of a network suitable for voice communications.

In a first aspect, the present invention provides a method of enhanced tandem communication.

In a second aspect, the present invention provides a method of enhanced tandem communication.

In a third aspect, the present invention provides apparatus for enhanced tandem communication.

In a fourth aspect, the present invention provides apparatus for enhanced tandem communication.

Further features of the present invention are as defined in the dependent claims.

Embodiments of the present invention will now be described by way of example with reference to the accompanying drawings, in which:

DETAILED DESCRIPTION

Figure 1:
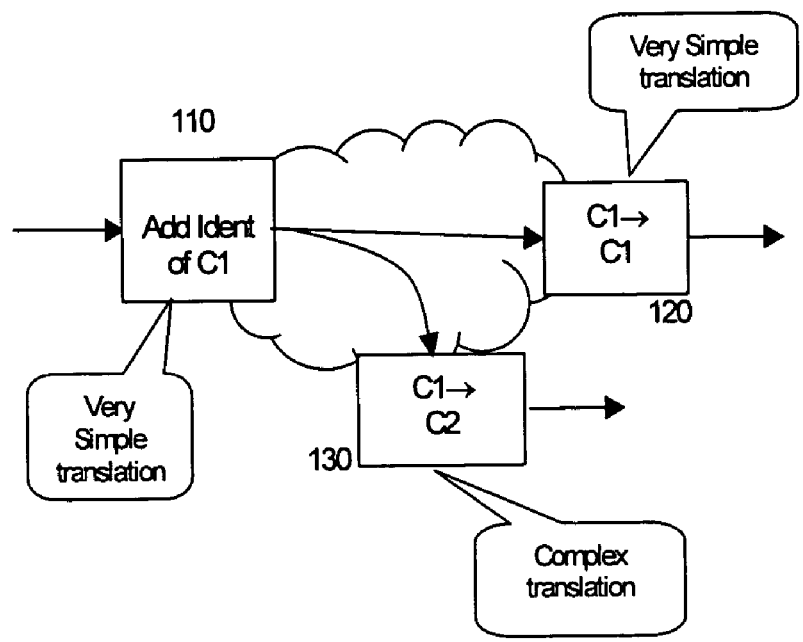
FIG. 1 is a block diagram showing a tandem communication method in the prior art.
Figure 2:
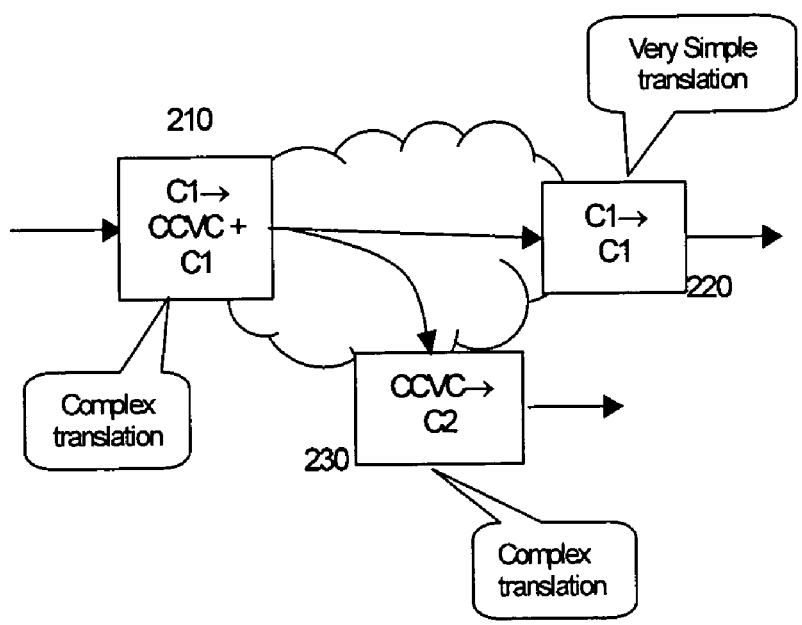
FIG. 2 is a block diagram showing an enhanced tandem communication method in accordance with an embodiment of the present invention.

Referring now to FIG. 2, a method of enhanced tandem communication is proposed between at least a first portion of a network suitable for voice communications and a second portion of a network suitable for voice communications.

These portions may be parts of the same or separate networks.

The inventors of the present invention have appreciated that an alternative to low-compression, high-bandwidth PCM speech coding may be employed that obviates the need for decoding data from a first codec into PCM speech, and then re-encoding it using a second codec.

This alternative is to transmit two representations 210 of an encoded signal that was produced by a codec of the first portion of a network (hereinafter 'first codec') in lieu of single PCM representation.

Thus in an embodiment of the present invention, one representation comprises the encoded signal produced by the first codec (hereinafter 'first encoded signal'); in other words, the encoded signal used in the first portion of a network.

The other representation comprises a parameter translation of the first encoded signal into an encoded signal compatible with a single common compressed voice codec (CCVC) format (hereinafter 'common encoded signal').

Parameter translation can have the advantage of converting high-level representations of speech such as line spectral frequencies or pitch-sharpening coefficients, without the complexity of decoding to speech and re-encoding or the attendant quality problems this brings, as outlined previously.

The CCVC is typically modelled as a CELP codec, as the most common codecs in current use are CELP codecs and using corresponding codec technology both simplifies the translation process and helps to maintain the overall end user speech quality.

Moreover, it is modelled as a high bit rate CELP codec as compared with the majority of wireless transmission CELP codecs. This reduces the additional compression of translated parameters and so also reduces the impact on overall end user speech quality.

It will be clear to a person skilled in the art that for a network or group of networks predominantly employing a different underlying codec technology to CELP, modelling the CCVC on a corresponding high bit-rate codec will be preferable.

In an embodiment of the present invention, the two representations 210 of the encoded signal are transmitted from the first portion of a network to a second portion of a network via a wired link. The wired link may be part of a public switched telephone network or a packet switched network.

In an embodiment of the present invention, an identifier unique to the type of the first codec is also transmitted.

In an embodiment of the present invention, the two representations 210 of the encoded signal are received 220, 230 from the first portion of a network by a second portion of a network via a wired link.

Suitable means within the second portion of the network then determines whether the first codec is compatible with a codec of the second portion of a network (hereinafter 'second codec').

This may be either by comparison of codec parameters and descriptors, or preferably by comparing a unique codec type identifier also received from the first portion of a network with a unique codec type identifier for the second codec. Use of such identifiers simplifies the determination process.

In an embodiment of the present invention, the identifier for the first codec is embedded in packets comprising the first encoded signal. This allows the enhanced tandem method to provide an 'opportunistic' tandem-free mode of operation if the second codec is the same as or compatible with the first codec 220, and wherein the first encoded signal is selected for further transmission by the second portion of the network.

This 'opportunistic' tandem-free mode of operation has the advantage over the prior art of not requiring the availability or implementation of end-to-end negotiation, and further of avoiding the delays to initial call set-up that such negotiation adds when it is available.

If however the first and second codecs are determined not to be compatible, then a parameter translation 230 of the common encoded signal into an encoded signal compatible with the second codec (hereinafter 'second encoded signal') is performed. This second encoded signal is then selected for further transmission by the second portion of the network.

By fixing the CCVC as a single format, or a format with a small number of variants, a single complex translation process 230 is able to take in the common enhanced signal representation and output the relevant second encoded signal, without the combinatorial problems experienced by the separate translation modules of the Dilithium Unicoding™ solution.

Moreover, when a network provider introduces a new codec, the onus is solely on that network provider to update their own version of the CCVC format encoder 210 and the converse translation process 230 for their network. Other networks will be able to use the common enhanced signal representation so produced without modification, and naturally only the network provider itself requires translation back into the new codec form. This greatly simplifies the deployment and maintenance of a tandemming solution.

An additional opportunity also exists with the inclusion of the two speech codec formats as part of the CCVF. A network operator may deploy a dedicated parameter translation scheme between a very few commonly used codecs from other networks to those used in his home network, where this results in superior quality over the more general tandemming described in this invention.

In summary, the use of the two representations of the first and common encoded signals 210 allows the enhanced tandemming method to employ tandem-free communication where possible without end-to-end negotiation, and where it is not possible then to help provide superior quality tandemming by use of parameter translation rather than intermediate PCM conversion. Where parameter translation is used, the combinatorial problems experienced by prior art solutions are further avoided.

Figure 3:
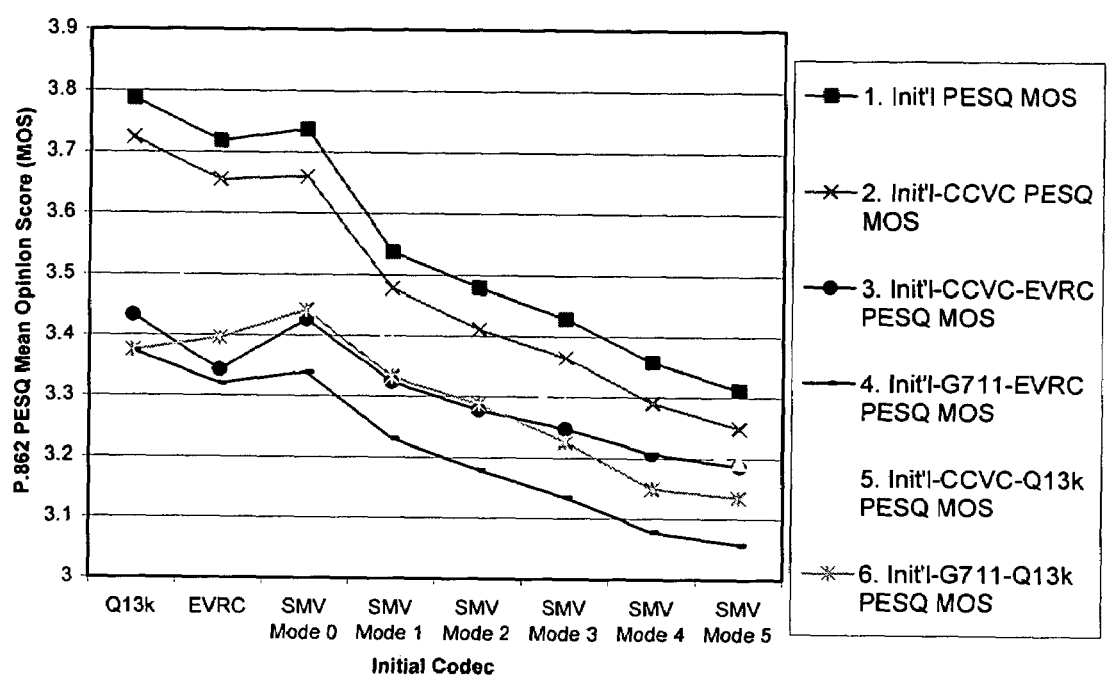
FIG. 3 is a graph relating different originating codecs (x-axis) to predicted mean opinion scores (y-axis) for different communication methods (plots 1 to 6).

Referring now to FIG. 3, this graph shows predicted perceptual evaluation of speech quality (PESQ) mean opinion scores (MOS) produced using the international telecommunication union standardisation sector provided ITU-T Rec. P.862, for eight source codec modes (IS-733 (Q13k), enhanced variable rate (EVRC) and SMV modes 0–5) when tandemmed with both EVRC and IS-733 (Q13k). In addition to these plots, results for tandem-free operation (plot 1) and speech synthesised directly from the CCVC format (plot 2) are given on the graph.

It can be seen that tandemming using the CCVC format, with a maximum rate of approximately 32 kb/s, provides better PESQ-MOS quality ratings than the other tandem solutions shown.

Plot 1 demonstrates the benefit of also providing the first encoded signal, providing a predicted 0.25–0.4 MOS improvement over CCVC format tandemming when possible.

In an embodiment of the present invention, apparatus for enhanced tandem communication between at least a first portion of a network suitable for voice communications and a second portion of a network suitable for voice communications comprises translation means for translating a common encoded signal into second encoded signal.

In an embodiment of the present invention, apparatus for enhanced tandem communication between at least a first portion of a network suitable for voice communications and a second portion of a network suitable for voice communications comprises translation means for translating a common encoded signal into second encoded signal.

The invention claimed is:

1. A method of enhanced tandem communication between at least a first portion of a network suitable for voice communications and a second portion of a network suitable for voice communications, characterised by the step of;
   transmitting from the first portion of a network two representations of an encoded signal, the encoded signal produced by a codec of the first portion of a network (hereinafter 'first codec'), the two representations respectively comprising;
   i. the encoded signal produced by the first codec (hereinafter 'first encoded signal'); and
   ii. a parameter translation of the first encoded signal into an encoded signal compatible with a single common compressed voice codec (CCVC) format (hereinafter 'common encoded signal').

2. A method according to claim 1 wherein the first portion of a network suitable for voice communications and the second portion of a network suitable for voice communications are part of the same overall network.

3. A method according to claim 1 further comprising the step of;
   transmitting the two representations of the encoded signal to the second portion of a network via a wired link.

4. A method according to claim 3 wherein the wired link is part of a public switched telephone network.

5. A method according to claim 1 wherein an identifier unique to the type of the first codec is also transmitted.

6. A method of enhanced tandem communication between at least a first portion of a network suitable for voice communications and a second portion of a network suitable for voice communications, characterised by the steps of;
   receiving from the first portion of a network two representations of an encoded signal, the encoded signal produced by a codec of the first portion of a network (hereinafter 'first codec'), the two representations respectively comprising;
   i. the encoded signal produced by the first codec (hereinafter 'first encoded signal'); and
   ii. a parameter translation of the first encoded signal into an encoded signal compatible with a single common compressed voice codec (CCVC) format (hereinafter 'common encoded signal'); and determining whether the first codec is compatible with a codec of the second portion of a network (hereinafter 'second codec').

7. A method according to claim 6 wherein the determination comprises comparing a unique codec type identifier also received from the first portion of a network with a unique codec type identifier for the second codec.

8. A method according to claim 6 wherein if the first and second codecs are determined to be compatible, then the first encoded signal is selected for further transmission by the second portion of the network.

9. A method according to claim 6 wherein if the first and second codecs are determined not to be compatible, then a parameter translation of the common encoded signal into an encoded signal compatible with the second codec (hereinafter 'second encoded signal') is performed.

10. A method according to claim 9 wherein the second encoded signal is then selected for further transmission by the second portion of the network.

11. Apparatus for enhanced tandem communication between at least a first portion of a network suitable for voice communications and a second portion of a network suitable for voice communications according to a method as claimed in claim 6, and comprising;
    translation means for translating a common encoded signal into second encoded signal.

* * * * *